United States Patent [19]
Phillips et al.

[11] Patent Number: 6,151,142
[45] Date of Patent: Nov. 21, 2000

[54] GRAZING INCIDENCE HOLOGRAMS AND SYSTEM AND METHOD FOR PRODUCING THE SAME

[75] Inventors: Nicholas J. Phillips, Loughborough, United Kingdom; Zane Coleman, Mableton, Ga.; Michael H. Metz, Yorktown Heights, N.Y.

[73] Assignee: Imedge Technology, Inc., Yorktown Heights, N.Y.

[21] Appl. No.: 09/008,348

[22] Filed: Jan. 16, 1998

Related U.S. Application Data

[63] Continuation-in-part of application No. 08/594,715, Jan. 31, 1996, Pat. No. 5,822,089, and a continuation-in-part of application No. 08/546,709, Oct. 23, 1995, Pat. No. 5,710,645, which is a continuation of application No. 08/373,878, Jan. 17, 1995, abandoned, which is a continuation of application No. 08/011,508, Jan. 29, 1993, abandoned.

[51] Int. Cl.$^7$ .................................................. G03H 1/04
[52] U.S. Cl. .................................. 359/3; 359/1; 359/32; 359/35
[58] Field of Search .......................... 359/3, 1, 35, 34, 359/32

[56] References Cited

U.S. PATENT DOCUMENTS 4,461,533  7/1984  Sherman et al. .......................... 359/19

OTHER PUBLICATIONS

H. Kogelnick, "Coupled Wave Theory for Thick Hologram Gratings", The Bell System Technical Journal, vol. 48, No. 9, pp. 2909–2947, Nov. 1969.

T. Kubota, et al., "Method for Reconstructing a Hologram Using a Compact Device", Applied Optics, vol. 31, No. 23, pp. 4734–4737, Aug. 1992.

*Primary Examiner*—Cassandra Spyrou
*Assistant Examiner*—John Juba, Jr.
*Attorney, Agent, or Firm*—Hopgood, Calimafde, Kalil & Judlowe

[57] ABSTRACT

A method and system are disclosed for recording and displaying grazing-incidence (i.e., steep reference beam angle) holograms supported on a substrate having thin edge-illuminatable geometry. The system and process use thin edge-illuminated substrates that facilitate optimal coupling of the reference light beam at steep angles approaching grazing incidence, while maximizing the contrast of the slanted fringe structures thereof. Different recording techniques are employed when the index of refraction of the substrate is greater than that of the recording medium, than when the index of refraction of the substrate is less than that of the recording medium. A recording and playback system of complementary design is provided for recording slanted-fringe volume holograms under relaxed conditions, without compromising the light diffraction efficiency of the holograms under different playback conditions.

1 Claim, 9 Drawing Sheets

GRAZING INCIDENCE HOLOGRAMS AND SYSTEM AND METHOD FOR PRODUCING THE SAME

RELATED CASES

This is a Continuation-in-Part of application Ser. No. 08/594,715, now U.S. Pat. No. 5,822,089 entitled "Compact Grazing Incidence Holograms and System for Producing Same" filed on Jan. 31, 1996, Ser. No. 08/546,709 now U.S. Pat. No. 5,710,645 entitled "Grazing Incidence Holograms And System And Method For Producing The Same" filed on Oct. 23, 1995, which is a Continuation of application Ser. No. 08/373,878 entitled "Edge Illuminated Holograms" filed on Jan. 17, 1995 now abandoned, which is a Continuation of application Ser. No. 08/011,508 entitled "Edge Illuminated Holograms" filed on Jan. 29, 1993, now abandoned, wherein each said Application is incorporated herein by reference in its entirety.

BACKGROUND OF THE INVENTION

1. Field of Invention

This present invention relates to grazing incidence, volume slanted fringe diffraction gratings, or holograms, with high fringe contrast, and a method and system for recording and playing back the same using a single pass, grazing incidence, light beam.

2. Brief Description of Prior Art

Various types of diffraction gratings have been developed during the past half century. These gratings may have the form of a surface relief, or may be structured within the volume of a material. Volume gratings are often produced using holographic techniques. Diffraction gratings may also be characterized as being transmission type or reflection type.

While transmission and reflection type holograms have enjoyed increasing popularity over the years, increasing attention is being given to grazing incidence type holograms. Grazing incidence as used herein is intended to refer to a large or "steep" angle of incidence with respect to the normal to an interface between two surfaces. Light for reconstructing a grazing incidence hologram may enter the hologram through its edge, or at the edge of a transmissive substrate material upon which the hologram is affixed (e.g., referred to as "edge-illuminatable" or "edge-referenced"), or may achieve grazing incidence for replaying the hologram by other means. The primary reason for the increasing interest in grazing incidence holograms is their compact geometry that lends itself to convenient use in diverse applications.

Consequently, the primary goal in many holographic recording techniques is to produce grazing incidence holograms having a very thin packaging or an ultra-compact overall geometry. However, when recording grazing incidence holograms, several assumptions about usual recording constraints do not apply, because the geometry imposed on the recording substrate and reference beam during the recording process, inherently imposes major restrictions on the properties of the recording materials used. Moreover, unless such restrictions are satisfied, low contrast fringes, and thus lower diffraction efficiency will result, since it is not possible to achieve high intensity transmission of light from the reference light source, through the recording substrate and into the recording medium, where the reference beam interferes with the object beam to create the desired interference pattern (i.e., fringes).

Some of the issues associated with edge-lit holograms are presented in a paper entitled "Edge-illuminated Holograms" by Juris Upatnieks published in Volume 31, No. 8, Applied Optics, Mar. 10, 1992. In this paper the author states that the use of thin substrates and extremely steep reference beam angles is impractical. Upatnieks proposes the use of an intermediate coupling layer (e.g. index matching fluid) between the recording emulsion and the substrate, which he calls a "cover plate" and recognizes the need to perform some matching of the index of refraction of the coupling layer to both the the recording substrate and the holographic recording medium. Index matching to reduce moire effects, and extra reflections, which result in stray fringe formation are commonly used in holography. However, in the Upatnieks article, the index of refraction of the holographic recording medium is not closely matched to the index of refraction of the substrate, and this paper does not teach the degree of index matching that is required. Consequently, the edge illuminated hologram described in the other prior art is not displayable with a sufficient degree of brightness. This has thus far severely limited the practical applications for grazing incidence holograms.

There is thus a need in the art for an improved system and method of producing holograms with high fringe contrast, using very steep reference beam angles and/or very thin substrates, thereby enabling ultra-compact geometries while avoiding the shortcomings and drawbacks of prior art holographic recording systems and methodologies.

OBJECTS OF THE INVENTION

Accordingly, a primary object of the present invention is to provide an improved grazing-incidence (i.e., steep reference beam angle) hologram which, in addition to having thin geometry, overcomes the shortcomings and drawbacks of prior art edge-lit hologram constructions.

It is another object of the present invention to provide a holographic recording technique that produces grazing incidence holograms that may be incorporated in a system having very thin packaging, or packaging having an ultra-compact overall geometry.

A further object of the present invention is to provide a novel system and process for recording and displaying steep reference angle holograms using thin edge-illuminated substrates that facilitate optimal coupling of the reference light beam at steep angles approaching grazing incidence.

A further object of the present invention is to provide a system and method for recording steep reference angle holograms using grazing-incidence reference beams in the substrates and beam intensity ratios which maximize the light diffraction efficiency of the holograms at their Bragg angles of operation.

A further object of the present invention is to provide a system and method for playing-back such recorded holograms using a grazing-incidence reference beam.

A further object of the present invention is to provide a system and method for recording steep reference angle holograms using steep angle reference beams optimally coupled to the recording medium in order to form high contrast fringes therein under various optical conditions.

SUMMARY OF THE INVENTION

The system and process of the present invention can be used to holographically record high contrast fringes in a holographic recording medium utilizing very steep reference beam angles, approaching grazing incidence conditions. In general, the recording system comprises a substrate of thin construction, a holographic recording medium, a laser light source, and object and reference beams. Polarization means may be used to adjust the relative polarization directions of the object and reference beams. Holographic recording systems of various configurations and geometry are disclosed for recording grazing incidence holograms according to the principles of the present invention. In each such embodiment, the substrate is made from an optically transparent material, which may be a solid or a fluid, having an index of refraction of $n_s$, and front and rear surfaces disposed substantially parallel to each other and an edge surface connecting front and rear surfaces.

The holographic recording medium has front and rear surfaces, with the rear surface of the holographic recording medium being disposed affixed to or in contact with the front surface of the substrate along an interface of substantially planar geometry. The function of the laser light source is to produce a laser beam. Laser beam splitting means may be provided to split the produced laser beam into an object beam for propagation along a first optical path, and a reference beam for propagation along a second optical path. The object beam directing means directs the object beam toward the holographic recording medium so that it propagates into the holographic recording medium. The reference beam directing means directs the reference beam into the substrate at a steep angle of incidence with respect to the normal to the interface so that the reference beam propagates through the interface and enters the recording medium and interferes with the object beam so as to form fringes in the holographic recording medium.

The system and method of the present invention can be used to optimally couple the reference beam into a recorded hologram during playback (i.e., display). However, during the holographic recording process of the present invention, optimal coupling of the reference laser beam within the substrate into the holographic recording medium is best carried out using methodologies that are dependent on the relative difference between the indices of refraction of the substrate and recording medium. Once the hologram has been recorded, using the methods described herein, and the fringes are fixed within the holographic medium, the relationship of the index of refraction of the substrate used for playback of the hologram to the index of refraction of the holographic medium can be considerably relaxed from the index relationships during recording. It is not necessary for the playback substrate to be the same as the recording substrate. Depending on which holographic recording medium is used, a hologram that has been recorded in a holographic medium such as sheet photopolymer, for example, may be delaminated from the recording substrate, and relaminated onto a different substrate for playback. The playback substrate should have an index of refraction less than that of the hologram. The closer the refractive indices of the playback substrate and the hologram match, the greater the amount of playback, or reconstruction light will reach the hologram. However, since playback illumination may necessarily be different than the laser used for recording (including e.g. a different laser, a light emitting diode, or white light), the need for a close index match between the playback substrate and the hologram is dependent on the needs of the actual system the hologram is being used in.

In two of the methods of holographic recording described herein, the index of refraction $n_s$ of the substrate is less than or equal to the index of refraction $n_m$ of the recording medium (Case 1), or is greater than or equal to the index of refraction $n_m$ of the recording medium (Case 2). In the first case, the holographic recording medium is made from an optically transparent material having an index of refraction $n_m$ greater than $n_s$ with the difference in index of refraction, $n_m-n_s$ being equal to $\Delta n$. For the first case, it has been discovered that for a given level of reference beam transmission from the recording substrate to the recording medium, the reference beam angle in the recording substrate is functionally related to the difference in the indices of refraction between the recording material and its substrate and a preselected intensity transmittance. This functional relationship has been used to provide a solution to the problem of optimally coupling the reference beam into the holographic recording medium at steep angles of incidence, and thus to provide a practical way of achieving (i.e., forming) fringes with high contrast in the holographic recording medium under such recording conditions. During playback, this relationship also provides a solution to the problem of coupling the reference beam from a playback substrate into the pre-recorded hologram. However, as noted above, this relationship need not be as stringent during playback as during recording, depending on the application and the type and intensity of playback illumination.

For the second case, where the index of refraction of the recording medium is less than the index of refraction of the recording substrate, the holographic recording system and process of the present invention achieves optimal refractive index matching using a holographic recording medium containing photopolymerizable monomers (i.e., photomonomers) that are free to migrate within the medium in response to light exposure. In either case, the goal is to create a slanted fringe volume diffraction grating whose fringe structure occurs throughout as much of the thickness, or volume of the recording medium as possible. Grazing incidence holograms made using prior art methods contain a fringe structure which occurs in only a thin layer of the recording medium. This creates a structure with reduced diffraction efficiency and filtering properties. In the prior art, if the substrate index of refraction was greater than the index of refraction of the recording medium, the grazing incidence reference beam produced an evanescent wave which only penetrated a very thin layer of the recording medium, and interfered with the object beam only in that thin layer, producing a very thin evanescent-wave hologram.

In Case 2 described herein it has been discovered that the grazing incidence reference beam is able to penetrate deeper into the recording medium, creating a higher efficiency volume holographic recording. During the holographic recording process, the photopolymer is exposed to an object beam from one side thereof, and simultaneously to a reference beam passing directly through the substrate at grazing incidence to the interface between the photopolymer and the substrate. In response to the production of an evanescent field present at the substrate-medium interface, the photomonomer in the photopolymer recording medium migrates (i.e. diffuses) toward the interface. This migration action locally increases the index of refraction adjacent the interface, creating a self-induced gradient-type index matching region between the recording layer and the substrate. Thus, in the case in which the index of refraction of the substrate is greater than the recording medium, the method and system of the present invention provide a practical way of producing true grazing incidence, volume slanted fringe holograms.

BRIEF DESCRIPTION OF THE DRAWINGS

For a more complete understanding of the present invention, the following detailed description should be read in conjunction with the accompanying drawings, wherein.

DETAILED DESCRIPTION OF THE ILLUSTRATIVE EMBODIMENTS

Figure 1A:
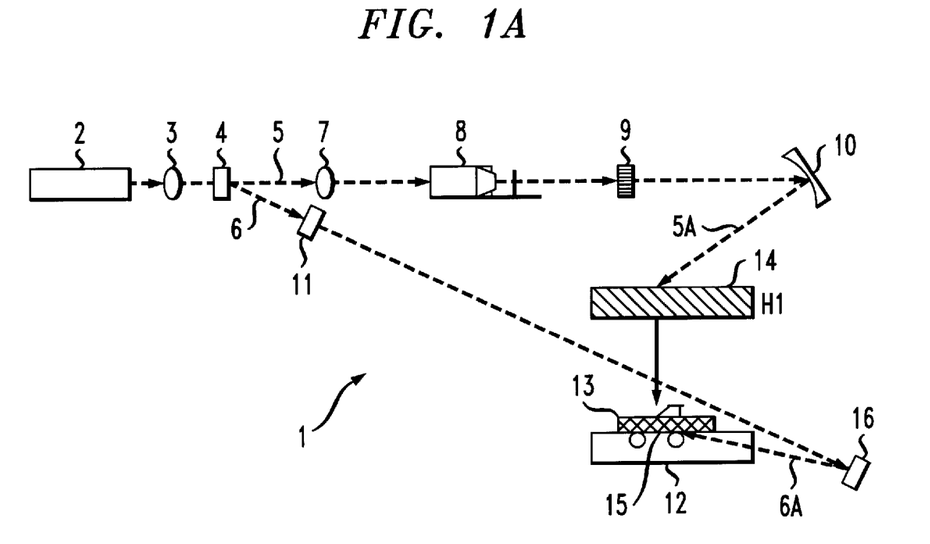
FIG. 1A is a schematic diagram of a recording system used to record reflection-type grazing-incidence holograms in accordance with the principles of the present invention.
Figure 1B:
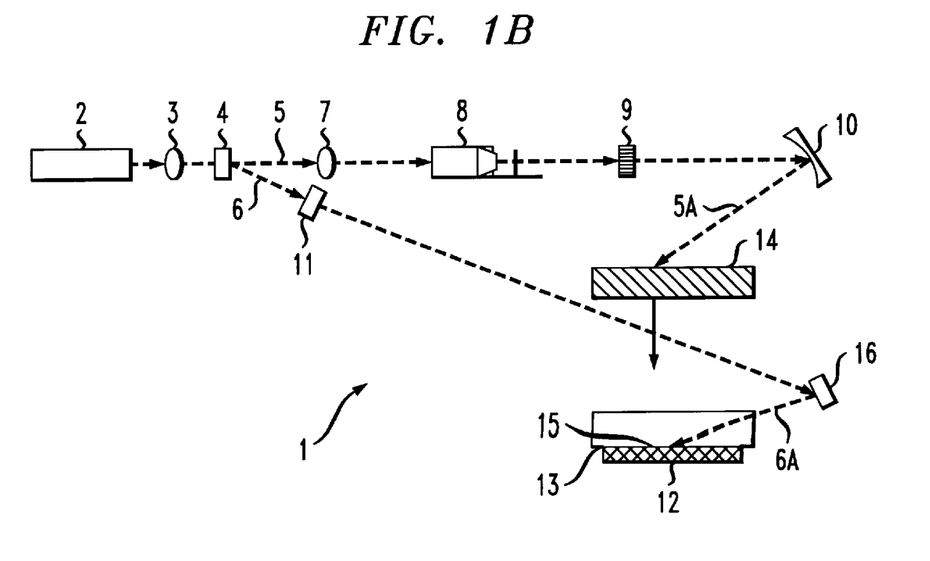
FIG. 1B is a schematic diagram of a recording system used to record transmission-type grazing-incidence holograms in accordance with the principles of the present invention.

In the embodiment of the invention shown in FIGS. 1A and 1B, a holographic recording system 1 is shown that comprises an exemplary arrangement of optical and electro-optical components. It should, however, be understood that many other workable arrangements are possible to one skilled in the art of holography. In the examplary embodiment shown in FIGS. 1A and 1B, the holographic recording systems include a laser source 2 for producing a laser beam of required output power; a ½ wave plate 3 for rotating the polarization state of the output laser beam so as to impart a predetermined beam-ratio to the object and reference beam intensities; a polarizing beam splitter 4 for splitting the laser beam into two polarized laser beams, i.e., an object beam 5 and a reference beam 6, each having an S-polarization state, directed along first and second optical paths, respectively; a second ½ wave plate 7, disposed along the first optical path for imparting the object beam with the same polarization imparted to the reference beam 6; a low-pass spatial filter (LPSF) 8, disposed along the first optical path, for expanding the object beam and eliminating high spatial frequency noise; an anti-Gaussian filter 9, disposed along the first optical path, for rendering the object beam with a uniform intensity profile; a spherical collimating mirror 10, disposed along the first optical path, for collimating the light rays of the object beam to produce a collimated object beam 5A; a cylindrical lens 11, disposed along the second optical path, for shaping the reference beam; a cylindrical collimating mirror 16, disposed along the second optical path, for collimating the light rays of the reference beam passing through cylindrical lens 11, and directing the collimated reference beam 6A into the edge portion of optically transparent substrate 12, upon which holographic recording medium 13 is disposed. As shown in FIGS. 1A and 1B, the region over which the recording medium contacts or engages the support substrate is referred to herein as the substrate-medium interface 15.

In the illustrative embodiments shown in FIGS. 1A and 1B, an "object" is recorded in the recording medium 13 supported upon the substrate 12. In this exemplary embodiment, the object is a holographic image of a toy truck previously recorded in transmission hologram (H1) 14 as shown.

FIG. 1A shows a configuration for producing a reflection-type grazing incidence hologram, and FIG. 1B shows a configuration for producing a transmission type grazing incidence hologram. The examples given herein show the reference beam entering the substrate through an edge of the substrate, thus producing grazing incidence illumination. The substrate edge may be perpendicular to the front and back faces, or the edge may be bevelled at an angle. In either case, the reference beam is arranged to enter the substrate to produce the desired grazing incidence angle within the substrate. Additionally, the reference beam may be directed to enter the substrate through its front or rear surface and may be directed to the appropriate grazing incidence angle within the substrate via other means, such as a prism or a diffraction grating.

Figure 11A:
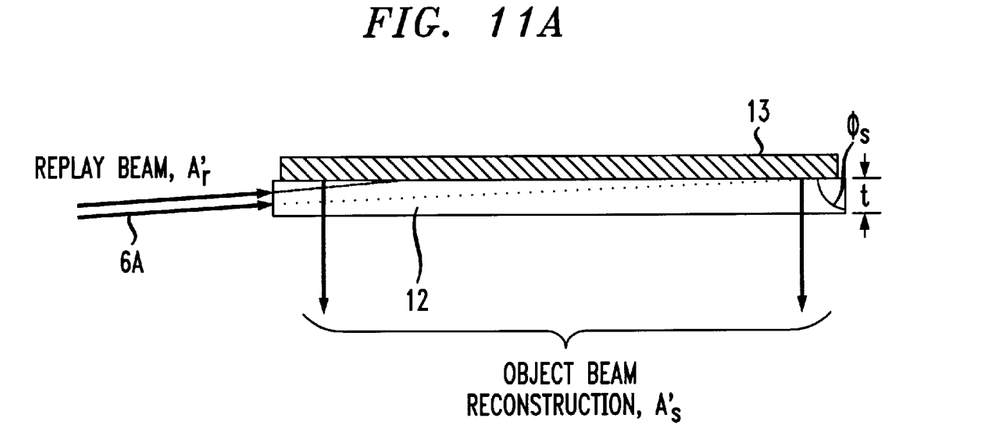
FIG. 11A is a schematic diagram illustrating a system for playing back reflection-type slanted-fringe hologram constructed according to the principles of the present invention.
Figure 11B:
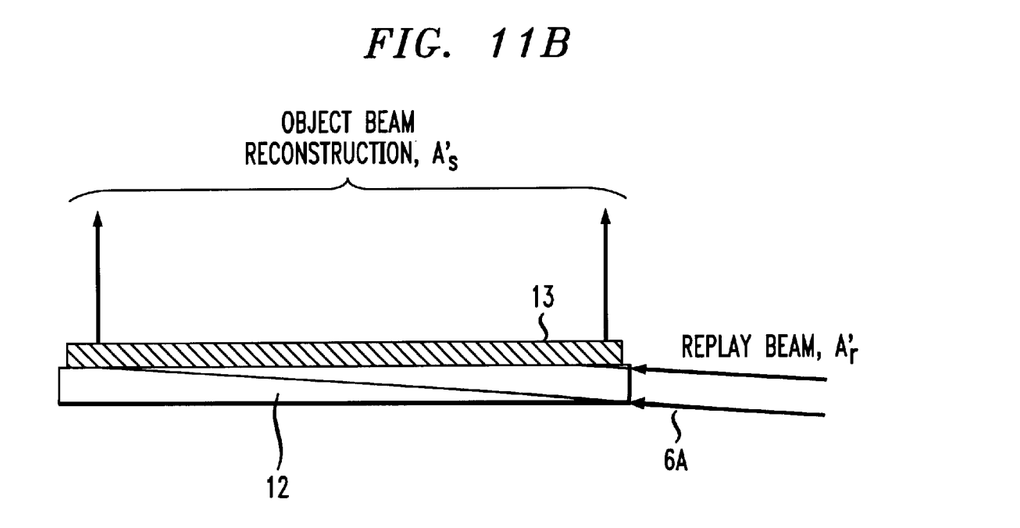
FIG. 11B is a schematic diagram illustrating a system for playing back a transmission-type slanted-fringe hologram constructed according to the principles of the present invention.

In the example described above, the object and reference beams have collimated wavefronts; however, depending on the application, the object and/or reference beams may have collimated, diverging, or converging wavefronts. Additionally, in the systems described herein, the object beam enters the recording medium at an angle less than the critical angle for the medium and the reference beam enters the recording medium at an angle greater than the critical angle for the medium. Although in the exemplary embodiment of the invention described herein, the object beam is produced by a previously recorded hologram, 14, the object beam may also directly strike a real object, with the scattered light from the object entering the holographic emulsion as the object beam interfering with the reference beam, or the object beam may not be associated with or representative of an object, but rather strike the recording medium directly, with the hologram recording a specific wavefront associated with the object beam. The latter case would form a holographic optical element. It is understood that the anti-Gaussian filter 9 is exemplary, and that other means (or no means at all) of manipulating the intensity distribution in the object and/or the reference beam may be employed, depending on the application requirements. It is to be further understood that either the real or virtual image of the hologram may be played back by simply illuminating the respective sides of the hologram during replay as illustrated in FIGS. 11A and 11B.

Figure 2A:
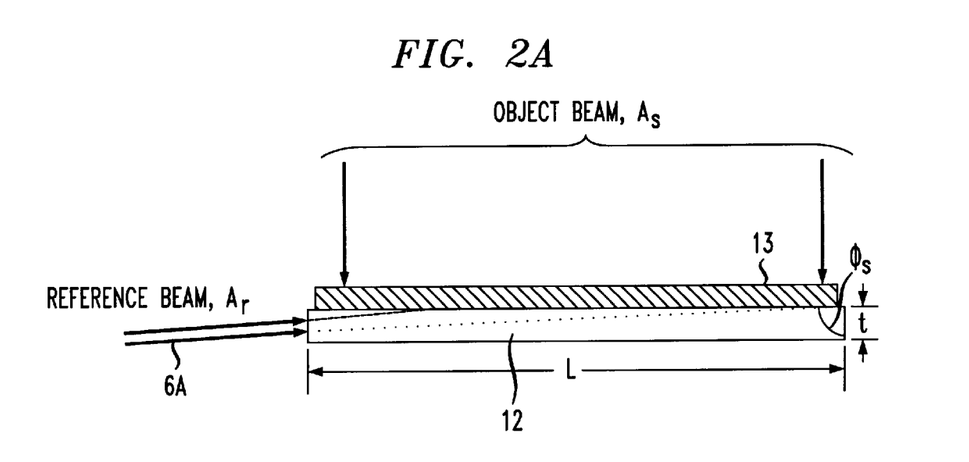
FIG. 2A is a schematic diagram showing the geometry of the substrate and recording medium for a reflection-type grazing-incidence hologram of the present invention, as well as the angle of attack of a reference beam launched from the edge of the structure into the substrate.

When the system of FIG. 1A is used to record a reflection-type edge-referenced hologram, the object beam is either passed directly through the holographic recording medium 13 supported upon the substrate 12 (i.e. when recording light diffractive gratings), or is initially reflected off an object (e.g. through a transmission hologram H1) so as to modulate the wavefront thereof prior to passing through the holographic recording medium 13. At the same time, the reference beam 6 is directed through the edge of the substrate 12 and travels through the opposite side thereof in a single-pass, grazing incidence manner, as best shown in FIG. 2A, to interfere with the object beam and create a volume slanted fringe pattern which is recorded therein.

Figure 2B:
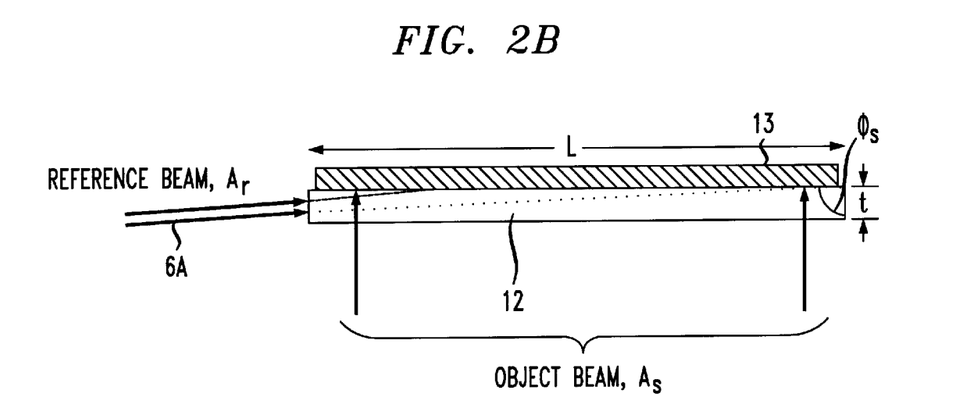
FIG. 2B is a schematic diagram showing the geometry of the substrate and recording medium for a transmission-type grazing-incidence hologram of the present invention, as well as the angle of attack of a reference beam launched from the edge of the structure into the substrate.

When the system of FIG. 1B is used to record a transmission-type grazing incidence hologram, the object beam is either passed directly through the holographic recording medium 13 supported upon the substrate 12 (i.e. when recording light diffractive gratings), or is initially reflected off an object (e.g. through a transmission hologram H1) so as to modulate the wavefront thereof prior to passing through the holographic recording medium 13. At the same time, the reference beam 6 is directed through the edge of the substrate 12 and travels through the same side thereof as the object beam, in a single-pass, grazing incidence manner, as best shown in FIG. 2B, to interfere with the object beam and create a volume slanted fringe pattern which is recorded therein.

Although an image-bearing hologram H1 is used as a physical "object" to modulate the object beam 5A in the illustrative embodiments described above, the wavefront of the object beam need not be phase and/or amplitude modulated by any sort of object, but may be instead produced from an optical system comprising light refractive, diffractive and/or reflective elements.

When using the system and method of the present invention to record grazing incidence holograms, it is preferred that significant geometrical restrictions be imposed on the polarization of the recording light. The use of P-mode polarized recording light will unavoidably result in a true negation of fringe contrast and "orange-peel" fringes in the recorded grazing incidence hologram H2. "Orange peel" fringes may be avoided by restricting both the object and reference beams to S-mode polarization during holographic recording. When birefringent base material is used to back the recording layer 13 (e.g., silver halide film on a Mylar base, or DuPont photopolymer on a Mylar base), conventional measures should be taken to avoid variations in fringe contrast in the H2 copy hologram which can arise due to variations in polarization across the angular spectrum of waves from the master hologram Hl represented by A1 and A2. When using the system and method of the present invention to record grazing incidence holograms, conventional measures should be taken to minimize reflections from the air-recording medium interface. Also, when recording grazing incidence holograms using the system and method of the present invention, care should be taken to suppress the partial reflections off the recording layer using known measures. Failure to suppress such reflections could lead to intolerable "orange peel" cosmetics in the recorded hologram.

OPTIMIZING THE FRINGE-CONTRAST OF GRAZING INCIDENCE HOLOGRAMS

The production of edge-referenced holograms with maximum light diffraction efficiency on Bragg requires optimization of the fringe-contrast thereof during the holographic recording process. The light diffraction efficiency of volume light diffraction holograms is expressed as a function of incidence angle, modulation depth $n_1$, and recording media losses, and is described in great detail, for example, in the paper entitled "*Coupled Wave Theory for Thick Hologram Gratings*" by Herwig Kogelnik, published in The Bell System Technical Journal (BSTJ), Volume.8, Number 9, at Pages 2909–2947, in November 1969, incorporated herein by reference.

The general approach to maximizing light diffraction efficiency on Bragg adopted by the method of the present invention is to model the interaction of the reference and object (i.e. signal) beams within the substrate and recording medium, and to determine therefrom the optimal conditions at which the ratio of the reference signal amplitude and signal amplitude maximizes the fringe contrast.

Figure 3:
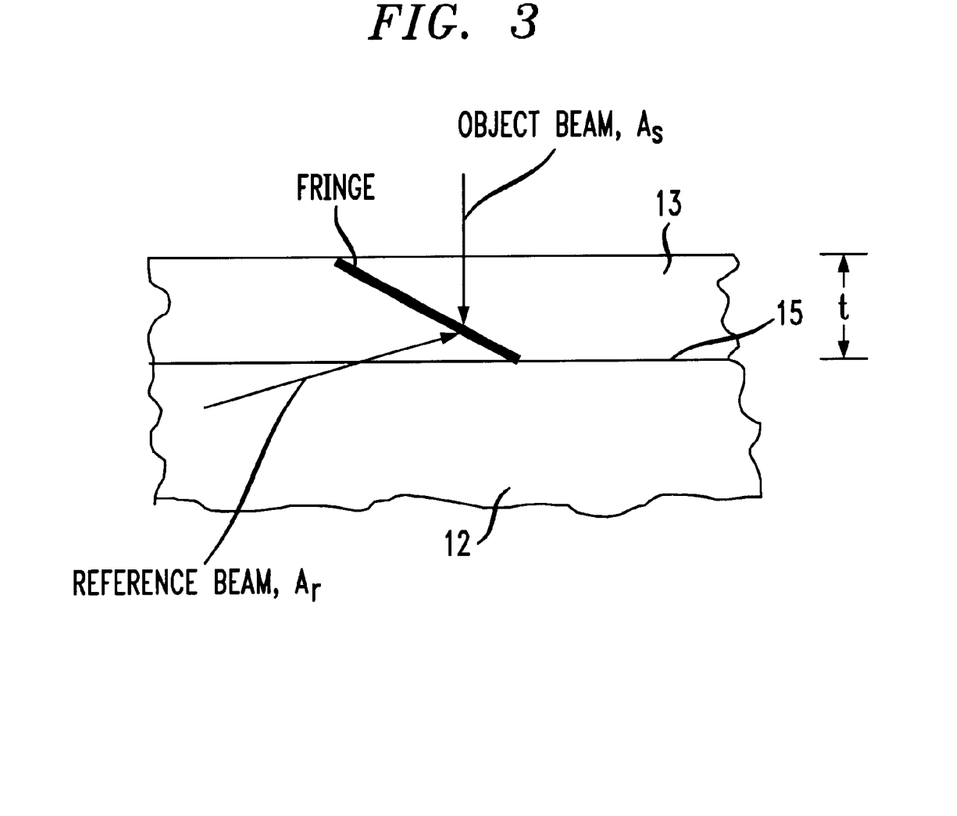
FIG. 3 is a geometrical optics diagram showing the interference of the reference beam and object beam during the recording creating slanted fringe structures in the grazing-incidence holograms of the present invention.

In FIG. 3 the general case of grazing incidence hologram (in this example a reflection type hologram is created) is shown being recorded with the object (i.e. the signal) beam directed incident normal to the recording film, while the reference beam is directed at a very steep grazing angle through the substrate. Using the schematic diagram of FIG. 3, mathematical expressions for the amplitudes of the signal and reference waves respectively can be expressed as follows:

$$A_s e^{ik_m y - \alpha(y+t)} \text{ and } A_r e^{-ik_m(x\sin\theta + y\cos\theta) + \frac{\alpha y}{\cos\theta}} \quad (1)$$

These expressions represent the signal and reference waves, respectively, with $A_s$ and $A_r$ as the signal and reference amplitudes, $\alpha$ the absorption coefficient of the recording medium, $k_m$ the wave propagation constant in the recording medium, and $\theta$ the internal angle which the reference beam makes with surface normal vector inside the recording emulsion. The total amplitude at any point in the hologram can be described by the expression:

$$A_{tot} = A_s e^{ik_m y - \alpha(y+t)} + A_r e^{-ik_m(x\sin\theta + y\cos\theta) + \frac{\alpha y}{\cos\theta}} \quad (2)$$

and the intensity thereof can be expressed as:

$$I = A_{tot} \times A_{tot}^* = A_s^2 e^{-2\alpha(y+t)} + A_r^2 e^{\frac{2\alpha y}{\cos\theta}} + \qquad (3)$$
$$2A_s A_r e^{-\alpha(y+t)+\frac{\alpha y}{\cos\theta}} \times \cos(k_m y + k_m(x\sin\theta + y\cos\theta))$$

As "contrast" within the recording medium is defined as $$C = \frac{I_{\max} - I_{\min}}{I_{\max} + I_{\min}} \qquad (4)$$

the fringe contrast for any point within the hologram can be expressed as:

$$C = \frac{2A_s A_r e^{-\alpha(y+t)+\frac{\alpha y}{\cos\theta}}}{A_s^2 e^{-2\alpha(y+t)} + A_r^2 e^{\frac{2\alpha y}{\cos\theta}}}. \qquad (5)$$

This mathematical expression can be simplified by multiplying the numerator and denominator by the factor $$e^{\alpha y - \frac{\alpha y}{\cos\theta} + \alpha t}$$

to provide an alternative expression for fringe contrast:

$$C = \frac{2A_s A_r}{A_s^2 e^{-\alpha y - \alpha t - \frac{\alpha y}{\cos\theta}} + A_r^2 e^{\alpha y + \alpha t + \frac{\alpha y}{\cos\theta}}}. \qquad (6)$$

In order to derive a mathematical expression for the average contrast within the recording medium, $$\langle C \rangle = \frac{1}{t} \int_{-t}^{0} C\, dy$$

several equivalences are made, namely $$z = e^{\alpha y + \alpha t + \frac{\alpha y}{\cos\theta}} \text{ and } \frac{\partial z}{\partial y} = \left(\alpha + \frac{\alpha}{\cos\theta}\right)$$

allowing Equation (6) above to be rewritten as:

$$\langle C \rangle = \frac{1}{\alpha t\left(1 + \frac{1}{\cos\theta}\right)} \int_{e^{\frac{-\alpha t}{\cos\theta}}}^{e^{\alpha t}} \frac{2A_s A_r}{A_s^2 + A_r^2 z^2}\, dz. \qquad (7)$$

The above expression can be further simplified by substituting $$\xi = \frac{A_r}{A_s} z \text{ and } \frac{\partial \xi}{\partial z} = \frac{A_r}{A_s} z$$

to provide the intermediate expression:

$$\langle C \rangle = \left(\frac{2}{\alpha t\left(1 + \frac{1}{\cos\theta}\right)}\right) \int_{\frac{A_r}{A_s} e^{\frac{-\alpha t}{\cos\theta}}}^{\frac{A_r}{A_s} e^{\alpha t}} \frac{1}{1 + \xi^2}\, d\xi \qquad (8)$$

When the simple integration expressed above encompasses the width of the recording medium where signal absorption occurs, the following expression is obtained for the average fringe contrast within the recording medium:

$$\langle C \rangle = \frac{2}{\alpha t\left(1 + \frac{1}{\cos\theta}\right)} \left[\tan^{-1}\left(\frac{A_r}{A_s} e^{\alpha t}\right) - \tan^{-1}\left(\frac{A_r}{A_s} e^{\frac{-\alpha t}{\cos\theta}}\right)\right] \qquad (9)$$

In order to determine the beam ratio $$\propto \frac{A_r^2}{A_s^2}$$

which will maximize the average fringe contrast throughout the recording medium, the first derivative of the above mathematical expression is taken with respective to the expression for the beam ratio provide the following mathematical expression:

$$\frac{\partial \langle C \rangle}{\partial \left(\frac{A_r}{A_s}\right)} = \frac{2}{\alpha t\left(1 + \frac{1}{\cos\theta}\right)} \left[\frac{e^{\alpha t}}{1 + \left(\frac{A_r}{A_s} e^{\alpha t}\right)^2} - \frac{e^{\frac{-\alpha t}{\cos\theta}}}{1 + \left(\frac{A_r}{A_s} e^{\frac{-\alpha t}{\cos\theta}}\right)^2}\right]. \qquad (10)$$

Setting the above Equation (10) equal to zero provides an expression for a maximum average fringe contrast occurring at the beam ratio given by the expression:

$$\frac{A_r^2}{A_s^2} = \frac{e^{\alpha t\left(1 + \frac{1}{\cos\theta}\right)} - 1}{e^{2\alpha t} - e^{\alpha t\left(1 - \frac{1}{\cos\theta}\right)}}. \qquad (11)$$

In the case of no absorption, the beam ratio goes to 1

$$\left(\text{i.e. } \lim_{\alpha \to 0} \frac{A_r^2}{A_s^2} = 1\right);$$

Since the beam ratio $$\frac{A_r^2}{A_s^2}$$

is a direct indication of the measured intensity ratios within the recording medium, the method of holographic recording according to the present invention employs this relationship to predict the optimum beam ratio for achieving maximum average contrast during the recording of grazing incidence holograms.

A general method for determining an optimal value for the beam ratio is now described that assumes that a particular recording medium and set of recording parameters are known. The first step of the method involves determining the absorption constants of the recording medium. This can be achieved by analyzing the sensitivity characteristics of the recording media (e.g. photopolymers) being used. After ascertaining the absorption constants of the recording medium, the mathematical expression set forth in Equation (11) above is parameterized using the ascertained absorption constant and the known internal angle of incidence of the reference beam. The parameterized expression is then plotted as a function of beam ratio, and from the resulting plot, the optimal value therefor can be readily determined and used to control the amplitude of incident reference and signal (i.e. object) beams illustrated in the recording systems of FIGS. 1A and 1B. It is to be understood that the above equations are given for the exemplary case of the object beam and reference beam both having collimated (planar) wavefronts, and the object beam entering normal to the substrate-recording medium interface. The equations should be modified for other configurations such as converging or diverging wavefronts, or an non-normal object beam angle. For example, polarizers, phase retardation plates, electro-optical modulators, neutral-density filters and/or other optical means can be used along the optical paths of these systems to control the amplitude of these beams so that the optimal beam ratio is realized within the recording emulsion during the recording process.

The "fringe contrast optimization" technique described above is most advantageous when recording grazing incidence holograms. This is because the path length of the reference beam in grazing incidence holograms is substantial, and so too are the absorptive losses that occur during the recording process. This technique provides a simple, yet effective way in which the optimal beam ratio is used during the recording process for producing grazing incidence holograms having high contrast volume slanted fringe structures.

MATCHING INDICES OF REFRACTION BETWEEN SUBSTRATE AND RECORDING MEDIUM

FIGS. 2A, 2B, 4 and 5 illustrate a Case 1 technique, in which, as previously stated, the index of refraction of the substrate $n_s$ is less than the index of refraction of the recording medium $n_m$. Under such optical conditions, a holographic recording may be realized using any conventional holographic recording medium, such as silver halide or a photopolymer (e.g. the HRF 352, HRF 300x006, and HRF 700x071 photopolymers commercially available from DuPont). The substrate may be realized using an optically transparent material, such as glass or plastic, or a fluid, having an index of refraction that is (i) functionally related to the index of refraction of the selected recording medium and (ii) the reference beam angle required in the particular application at hand. The precise specification of the indices of refraction for the recording medium and substrate is described in detail below. Using this technique, high-quality, high-diffraction efficiency slanted fringe volume holograms, in extremely thin structures, e.g. edge-lit grazing incidence angles greater than 80 degrees, typically, and as steep as 85–89 degrees have been successfully recorded.

As shown in FIGS. 2A and 2B, when using a thin substrate a considerable restriction is imposed on the angle of attack of the incoming reference beam measured with respect to the interface between the substrate and the recording material. The angle $\phi_s$ is on the order of that given by the relationship:

$$\tan\phi_s = \frac{L}{t} \tag{12}$$

where L is the length of the substrate and t is its thickness. The amplitude of light transmitted across the interface (i.e., defined between the substrate and overlaid recording layer) is given by the relationship:

$$\frac{A_t}{A_i} = \frac{2\sin\phi_m\cos\phi_s}{\sin(\phi_m + \phi_s)} \tag{13}$$

where $A_t$ is the amplitude of the light transmitted at the interface, $A_i$ is the amplitude of the light incident at the interface, and $\phi_s$ and $\phi_m$ are the angles with respect to the normal to the interface in the substrate and medium, respectively. This equation is then combined with Snell's Law, $$n_m\sin\phi_m = n_s\sin\phi_s \tag{14}$$

where $n_s$, and $n_m$ are defined above.

Figure 4:
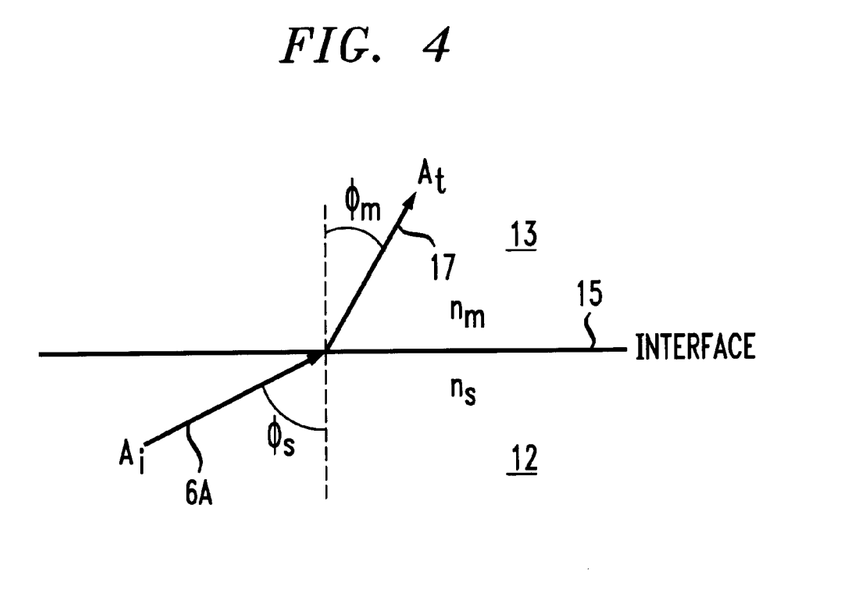
FIG. 4 is schematic diagram illustrating the interfacial refraction which occurs at the interface between the substrate and recording medium of the grazing-incidence system of the present invention, for Case 1 where the index of refraction of the recording medium $n_m$ is greater than the index of refraction for the hologram substrate $n_s$.

As shown in the ray diagram of FIG. 4 (where $n_m > n_s$), the light rays 6A of the reference beam having incident amplitude $A_i$, travel through the substrate 12 and strike interface 15 at an angle $\phi_s$ with respect to the normal, and are refracted into recording medium 13. The transmitted rays 17 travel in recording medium 13 at an angle $\phi_m$ and with a transmitted amplitude $A_t$.

Previously, an approximation was used at this point to estimate the transmitted intensity. However, it has been discovered that by using the following equations, the actual index matching of the substrate to the recording material, though still stringent, is somewhat less stringent than the previously used approximation would indicate.

Thus, using the symbolic expressions developed above, Equation (13) can be re-expressed in the form:

$$\frac{A_t}{A_i} = \frac{\left(\frac{2n_s}{n_m}\right)}{\sqrt{1 + \tan^2\phi_s - \left(\frac{n_s}{n_m}\tan\phi_s\right)^2} + \frac{n_s}{n_m}} \tag{15}$$

Significantly, this criterion sets a stringent demand on refractive index matching required during the holographic recording process when the refractive index of the recording medium is greater than the refractive index of the substrate (i.e., Case 1).

Then, using Fresnel's relations for S-mode polarization and Snell's Law, the intensity transmittance T of the reference beam into the recording medium at an angle of incidence $\phi_s$ can be shown to be equal to:

$$T = \left(\frac{n_m\cos\phi_m}{n_s\cos\phi_s}\right)\left(\frac{A_t}{A_i}\right)^2 \tag{18}$$

or, substituting for the amplitudes and $\theta_m$ we get $$T = \frac{4\frac{n_s}{n_m}\sqrt{1 + \tan^2\phi_s - \left(\frac{n_s}{n_m}\tan\phi_s\right)^2}}{\left(\frac{n_s}{n_m} + \sqrt{1 + \tan^2\phi_s - \left(\frac{n_s}{n_m}\tan\phi_s\right)^2}\right)^2} \tag{19}$$

Figure 5:
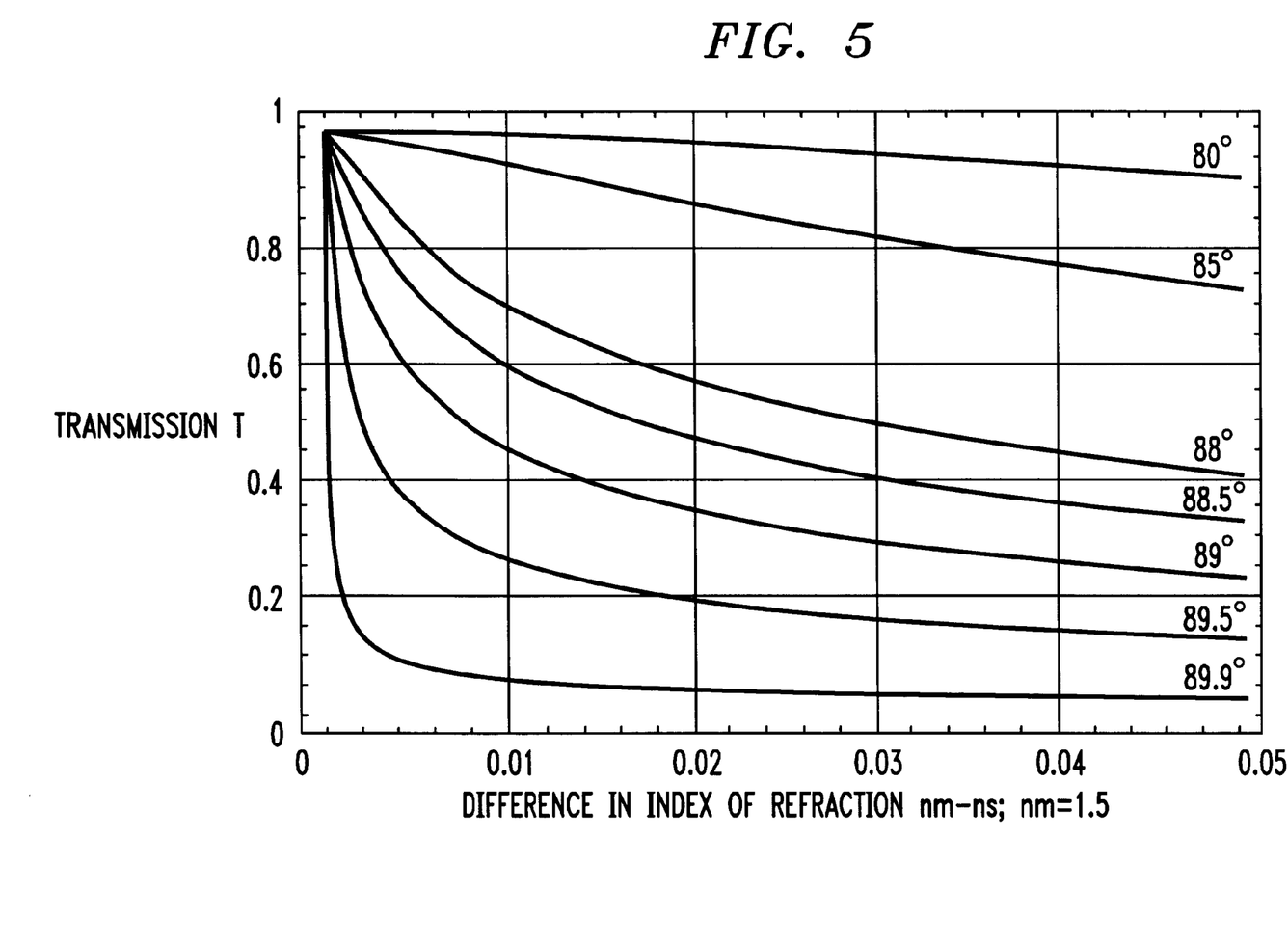
FIG. 5 is a set of functions (i.e., plots) relating (i) the difference in index of refraction $\Delta n$ between the recording medium and recording substrate, and (ii) the intensity of light from the reference beam transmitted through the substrate into the recording medium, for a set of reference beams approaching different angles of grazing incidence.

The functions plotted in the data table of FIG. 5 have been computed for seven exemplary grazing incidence reference angles $\phi_s$ using (1) Equation (19), (2) Snell's Law, and (3) a set of $\phi_n$ values derived from (i) indices of refraction for the substrate $n_s$ starting at 1.45 and approaching 1.5, and (ii) a fixed index of refraction for the recording medium $n_m = 1.5$. The set of functions set forth in FIG. 5 shows that a functional relationship exists among (i) the transmitted intensity of the reference beam across the substrate-medium interface, (ii) the difference in index of refraction Δn between the substrate and the recording medium, and (iii) the angle of incidence of the reference beam with respect to the substrate-medium interface. This functional relationship provides a solution to the problem of coupling a reference beam into the recording medium at steep angles of incidence, as required in the restrictive geometry of most grazing incidence holograms.

As illustrated in FIG. 5, when $n_m > n_s$ (i.e., Case 1), light will couple reasonably efficiently (from the substrate) into the recording medium at angles $\phi_s$ approaching grazing incidence by simply choosing the refractive index of the substrate $n_s$ to be below that of the recording material by an amount specified by the functional relationship embodied between Equation (19) and Snell's Law for a desired transmitted intensity.

The holographic recording method for Case 1 recording conditions was carried out using photopolymers (e.g. HRF 352, HRF300×006 and HRF700×071) from DuPont's Optical Element Venture Group as the holographic recording medium 13'. This photopolymer has a bulk refractive index of approximately 1.5. The indices of refraction of the substrates were matched to the photopolymer index of refraction as closely as possible. For example, it has been found that the refractive indices of Dupont's HRF-352 photopolymer and BK10 glass are very well matched for use in recording grazing incidence volume slanted fringe holograms. These photopolymers have been found to be excellent recording materials due to their low scatter and useful modulation indices.

Figure 6:
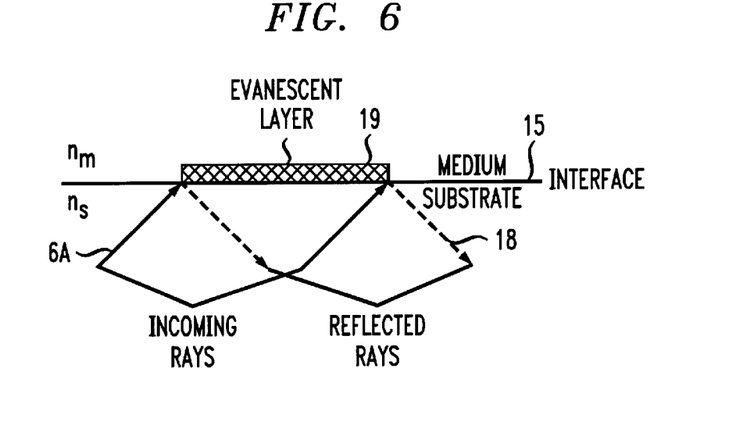
FIG. 6 is a schematic diagram illustrating that during the holographic recording process of Case 2 of the present invention, an evanescent layer is created at the recording medium-substrate interface by the reflection of light from the reference laser beam.
Figure 7:
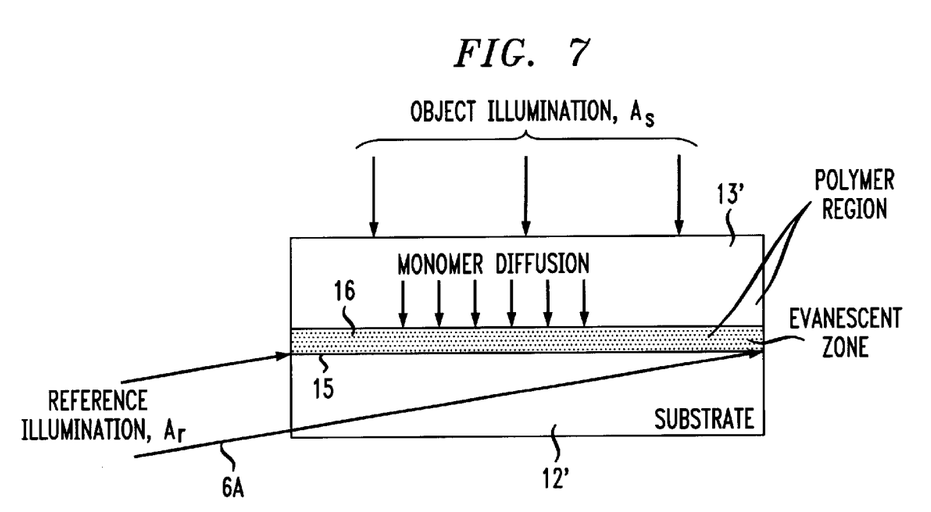
FIG. 7 is a schematic diagram illustrating the self-induced index matching phenomena carried out in a self-imaging type photopolymeric recording medium during the recording process for Case 2 of the present invention.
Figure 8:
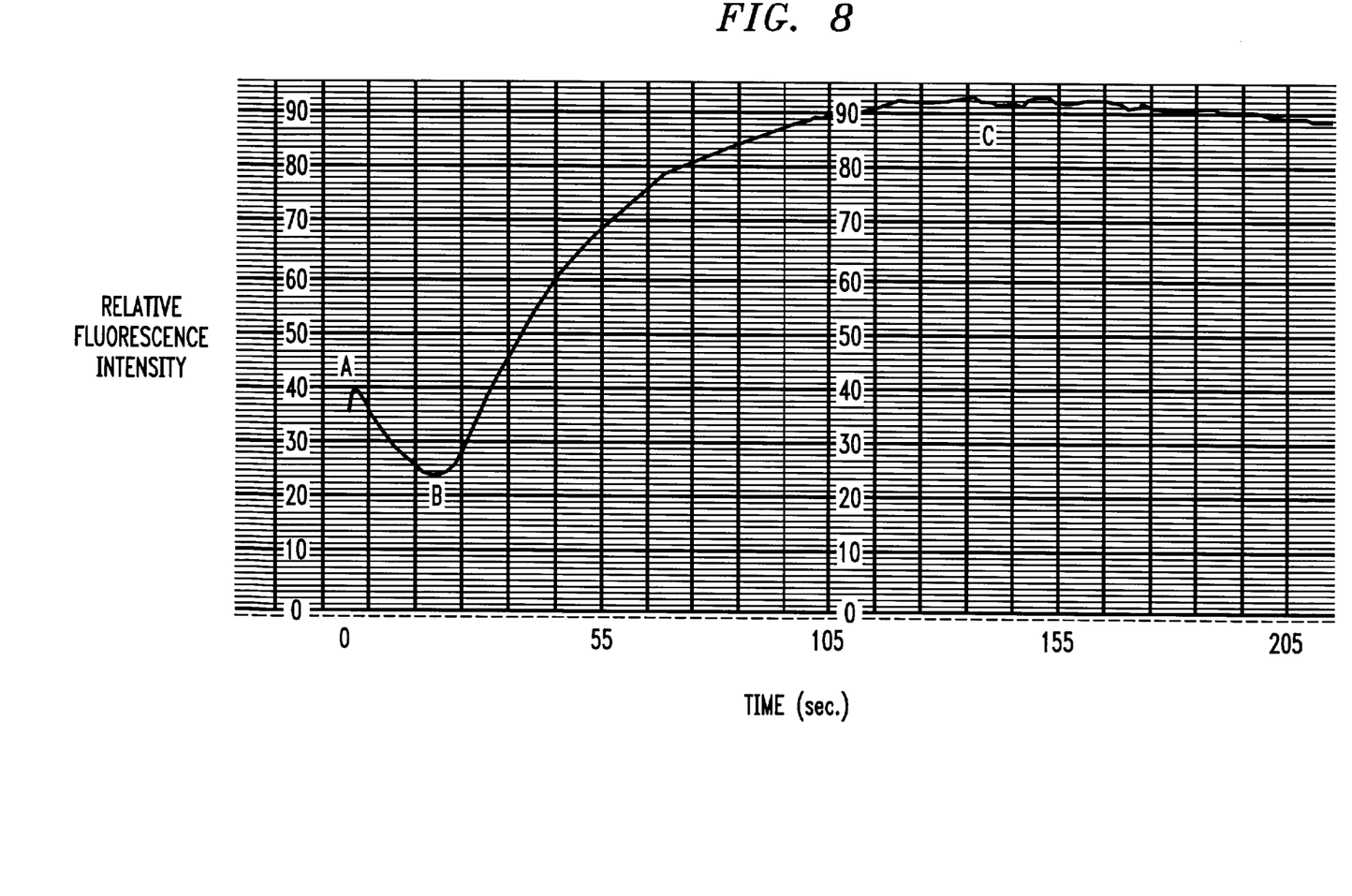
FIG. 8 is a schematic representation of the relative fluorescence intensity as a function of time, which can be used to measure the exposure and determine when the reference beam has sufficiently penetrated the recording medium.

Referring now to FIGS. 6, 7 and 8, Case 2 is described in which the index of refraction of the edge-illuminated substrate $n_s$ is greater than the index of refraction of the recording medium $n_m$. In this second case, the situation is more subtle. Once the angle of incidence $\phi_s$ exceeds the critical angle, given by the expression:

$$\sin\phi_s = \frac{n_m}{n_s} \tag{20}$$

then total internal reflection occurs and significant light fails to enter the recording medium. Moreover, under such optical conditions, an evanescent layer is created just inside the interface in the recording medium. This effect is known and is described in a detailed study in the article entitled "Evanescent Waves in Optical Imaging" by Bryngdahl, published in Progress in Optics, Vol. XI, Ed. E. Wolf, North Holland, 1973.

FIG. 7 illustrates the evanescent layer formed by the reflection of the reference beam which is incident from the denser medium, i.e., the substrate, where $n_s > n_m$. As shown, incoming rays from the reference beam 6A strike the interface 15 between the substrate 12 and the recording medium 13, giving rise to reflected rays 18 and evanescent layer 19. The penetration depth of the evanescent field depends on the angle of incidence $\phi_s$ and, in essence, decreases as $\phi_s$ decreases. The reflected light is subject to a spatial shift, known as the Goos-Hanchen shift, described in detail in the Bryngdahl paper. Detailed calculation shows that $$\lambda_p = \frac{\lambda_a}{(n_s^2 \sin^2\phi_s - n_m^2)^{\frac{1}{2}}} \tag{21}$$

where the evanescent wave amplitude falls off in accordance with the exponential function:

$$\exp\left(-\frac{2\pi z}{\lambda_p}\right) \tag{22}$$

where αp is a penetration parameter, αa is the air wavelength and z is the coordinate normal to the interface.

Using the above relationships, Equation (21) can be rewritten in approximate form as follows:

$$\lambda_p = \frac{\lambda_a}{\left[(n_m^2 + 2n_m\Delta n)\left(\frac{L^2}{t^2 + L^2}\right) - n_m^2\right]^{\frac{1}{2}}} \tag{23}$$

where $\Delta n = n_s - n_m$. Since $\Delta n \ll n$, Equation (22) above can be written in the form $$\lambda_p = \frac{\lambda_a \sqrt{t^2 + L^2}}{\sqrt{2n_m \Delta n L^2 - n_m^2 t^2}} \tag{24}$$

which can be approximated by:

$$\frac{\lambda_a L}{\sqrt{2n_m \Delta n L^2 - n_m^2 t^2}} \tag{25}$$

Letting Δn go to zero (i.e., Δn<<0) from above zero, the penetration of the evanescent layer into recording medium is perfect for the condition where:

$$\Delta n = \frac{n_m t^2}{L^2} \tag{26}$$

The above concepts are fundamental to the process of reference beam coupling (i.e., transmission) at the substrate-medium interface when $n_s > n_m$.

In the illustrative embodiment of the present invention, the Case 2 recording system described above is carried out using photopolymer recording medium 13' disposed on a substrate 12', as shown in FIG. 7. The refractive index $n_m$ of the photopolymer recording medium is chosen to be slightly less than the bulk refractive index of the substrate $n_s$, or the refractive index of the substrate is chosen to be slightly greater than the refractive index of a given photopolymer. The photopolymer recording medium 13' comprises a photopolymerizable monomer having a lower index of refraction than the polymer component which functions as the recording medium. With this recording system, grazing incidence holograms are made using a grazing incidence, one-pass reference beam.

During the recording process, laser light exposure times of a few tens of seconds, usually about half a minute or so, were found to be sufficient to expose the various DuPont photopolymers and the matched substrates as described above. As the collimated input reference I beam 6A generates the evanescent layer 16 during the exposure process, this region glows due to the progressive increase in fluorescent light produced from the sensitizing dye in the photopolymer recording layer 13'. As illustrated in FIG. 7, the evanescent layer 16 encourages the monomer in the photopolymer to diffuse toward the evanescent layer, and this monomer polymerizes therein, thereby increasing the refractive index in the photopolymer adjacent to the interface 15'. The total fluorescence of the film greatly depends on the volume of film which is exposed. This phenomenon enables one to detect the conditions of precise index matching for the reference beam coupling from the substrate to the film. In the initial stage of recording, a Total Internal Reflection (TIR) situation exists, and the reference beam is only penetrating into the film layer slightly according to the transverse Goos-Hanchen shift. The fluorescence from this initial penetration actually decreases due to the dye molecules breaking down or "bleaching". However, this only occurs in the evanescent layer. This penetration depth is sufficient to allow the monomer to diffuse therein increasing the local refractive index in the area of the reference penetration, and thus allowing further penetration because the conditions of TIR have changed. The plane of TIR would effectively be moving in the −y direction (opposite to the direction of diffusion). This self-induced gradient index matching is indicated by a dramatic increase in fluorescence. thereby allowing one to determine when precise index matching has been achieved at the interface and thus when laser exposure can be ceased to avoid oversaturating the recording film.

The schematic representation of FIG. 8 shows the increase in fluorescence produced from a constant intensity reference beam over a duration of 215 seconds. This characteristic has been produced using the holographic recording system of FIG. 1A, without a signal (i.e. object) beam passed through the recording film, and with the detector placed behind the recording film, instead of the black light dump. As illustrated in FIG. 8, the exposure process begins at point A; most of the monomer diffusion begins at point B; and the reference signal begins to penetrate through the recording film until point C, when the fluorescence begins to saturate and gradually falls off due to dye-bleaching. During this exposure process the hologram (i.e., slanted-fringe pattern) blooms in the recording medium as the refractive index at the interface in the photopolymer rises to match that of the substrate. This phenomenon of gradient index-matching permits an effective way of achieving local optimization of reference light (beam) transmittance at the interface 15' between the recording layer 13' and the substrate. This index matching technique allows some of the dynamic range of the index modulation of the recording medium for recording slanted fringe structure therein to be conserved so as to increase the light diffraction efficiency of the resulting hologram. This fluorescence monitoring technique can also successfully be applied to Case 1.

In Case 2 recording situations, such index modulation conservation is achieved by allowing the object beam into the recording medium only when the gradient-type indexing matching region has been formed, (i.e. when fluorescence increases greatly). It has been discovered that allowing the object beam into recording medium (e.g. HRF 700×071 photopolymer on FK5 glass) prior to the formation of the gradient-type index matching region, results in fogging the recording medium. The characteristic of FIG. 8 can be used to determine when the object beam should be allowed to enter the recording medium.

In Case 1 recording situations, however, fluorescence of the photopolymer attains its maximum intensity immediately upon the reference beam entering the recording substrate, and thereafter gradually drops off, in contrast with the intensity versus time characteristics for Case 2 recording situations, shown in FIG. 8. Consequently, in Case 1 recording situations, the object beam should be immediately allowed to enter the photopolymer (e.g. HRF 700×071 film on fused silica) at the same time the reference beam is allowed to enter the same. This exposure technique will ensure that the dynamic range of the index modulation of the photopolymer is conserved for recording slanted fringe structure therein.

For the above-described process of gradient index matching to be useful, the original refractive indices of the substrate and photopolymer should be very closely matched. If these refractive indices are not closely matched prior to the gradient indexing matching process, then the dynamic range of the index modulation within the recording film will be used for reference signal penetration, while little dynamic range for producing slanted fringe structure within the hologram. For the class of photopolymers used in carrying out the illustrative embodiments of the present invention, the refractive index change Δn achievable in the photopolymer is approximately greater than 0 and less than or equal to 0.07. Consequently, the change in refractive index over the gradient index matching region (i.e. between the recording medium and the substrate) can be made to vary by this amount, depending on the particular photopolymer formulation used.

Once the hologram has been recorded, using either Case 1 or Case 2, or the additional method described below, and the fringes are fixed within the holographic medium, the relationship of the index of refraction of the substrate used for playback of the hologram to the index of refraction of the holographic medium can be considerably relaxed from the index relationships during recording. It is not necessary for the playback substrate to be the same as the recording substrate. Depending on which holographic recording medium is used, a hologram that has been recorded in a holographic medium such as sheet photopolymer, for example, may be delaminated from the recording substrate, and relaminated onto a different substrate for playback. The playback substrate should have an index of refraction less than that of the hologram. For example, success has been achieved with recording holograms using DuPont 352 photopolymer on BK10 glass, and then delaminating the photopolymer from the glass and replacing it onto an acrylic substrate, whose index of refraction is somewhat less than that of the BK10 glass. The closer the refractive indices of the playback substrate and the hologram match, the greater the amount of playback, or reconstruction light will reach the hologram, and the greater the relative amount of output to input light is emitted from the hologram. However, since playback illumination may necessarily be different than the laser used for recording (including e.g. a different laser, a light-emitting diode, or white light), the need for a close index match between the playback substrate and the hologram is dependent on the needs of the actual system the hologram is being used in.

RECORDING AND REPLAYING GRAZING INCIDENCE HOLOGRAMS USING A COMPLEMENTARY SYSTEM

While grazing incidence holograms are highly desired from the standpoint of geometrical compactness during hologram playback, there exists a need for an alternative system and method for recording grazing-incidence holograms without the constraints imposed by the holographic recording arrangement shown in FIGS. 2A and 2B. As described below, this alternative system and method is developed by first describing the slanted-fringe structure of a grazing-incidence hologram using an appropriate geometrical optics model, and then using this model to arrive at a set of conditions which a complementary holographic recording and playback system must satisfy in accordance with the principles of the present invention.

As is well known, the fringes of a hologram are formed by the interference of a reference beam incident upon the recording medium at angle θr and an object beam incident upon the recording medium at angle θs. The interference of these beams spatially modulates the bulk refractive index of the recording medium in accordance with the resulting interference pattern. If the angles θr and θs are not symmetrically located with respect to the normal to the recording medium, the interference creates, in effect, a slanted fringe structure in the recording medium. The spacing between the slanted fringes (i.e. the fringe spacing) measured in the x-direction of the recording medium can be denoted as $d_x$ and is given by the mathematical expression:

$$d_x = \frac{\lambda_m}{|\sin\theta_s - \sin\theta_R|} \quad (27)$$

In order to obtain an expression for this parameter in terms of the wavelength measured in air, the relation $\alpha m = \alpha/n$ can be used to rewrite the above expression as follows:

$$d_x = \frac{\lambda_a}{n(|\sin\theta_s - \sin\theta_R|)} \quad (28)$$

Using this expression, the absolute fringe spacing, $\Lambda = d_x \cos\phi$ can be expressed as:

$$\Lambda = \frac{\lambda_a \cos\phi}{n(|\sin\theta_s - \sin\theta_R|)} \quad (29)$$

where the "fringe angle" is defined as:

$$\phi = \frac{\theta_S + \theta_R}{2} \quad (30)$$

Then using the trigonometric identity $$\sin\alpha - \sin\beta = 2\cos\frac{1}{2}(\alpha + \beta)\sin\frac{1}{2}(\alpha - \beta) \quad (31)$$

and performing some elementary algebraic operations, the "fringe spacing" $\Lambda = d_x \cos\phi$ can be rewritten in terms of the wavelength of the reference and object beams in air (a and the recording angles ($_r$ and ($_s$ thereof, as follows:

$$\Lambda = \frac{\lambda_a}{2n\left|\sin\left[\frac{1}{2}(\theta_S - \theta_R)\right]\right|} \quad (32)$$

Equations (30) and (32) define the relations among the principal characteristics of the slanted-fringe structure of a grazing-incidence hologram. If one were to make the same hologram using two different recording systems, then the hologram must have the same fringe spacing and fringe angle. Therefore Equations (30) and (32) must hold among such recording arrangements to ensure equivalence (i.e. $\Lambda_1 = \Lambda_2$, and $\phi_1 = \phi_2$), where subscripts 0 and 1 designate indices for the first and second complementary recording systems. Using Equations (30) and (32) and the grating equation, the following relation can be derived for the two holographic recording systems:

$$\frac{\lambda_{a1}\cos\phi_1}{n(\sin\theta_{S1} - \sin\theta_{R1})} = \frac{\lambda_{a2}\cos\phi_2}{n(\sin\theta_{S2} - \sin\theta_{R2})}. \quad (33)$$

Since the fringe angles must be the same for the holograms made using the two complementary systems, the above expression can be reduced to:

$$\lambda_{a2} = \left(\frac{\sin\theta_{S2} - \sin\theta_{R2}}{\sin\theta_{S1} - \sin\theta_{R1}}\right)\lambda_{a1}. \quad (34)$$

By recognizing that the principle of reciprocity applies to each of these different recording arrangements, a significant logical step can be made, namely that one of these geometrical arrangements can be used to record a slanted fringe grazing incidence volume hologram using the set of construction parameters specified by (θr1, θs1, θ1) while the other geometrical arrangement can be used to replay the grazing incidence hologram using the set of reconstruction parameters specified by (θr2, θ2, α). As will become apparent hereinafter, this discovery reveals that a slanted-fringe volume hologram can be read under a set of conditions which are favorable and easy to satisfy in most recording environments, and yet can be replayed under a different set of conditions which are favorable and easy to realize in desired playback environments.

Figure 9:
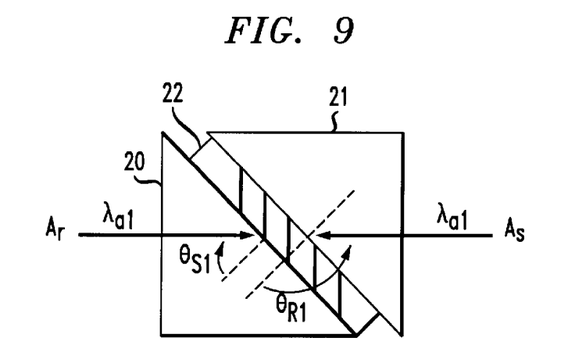
FIG. 9 is a schematic diagram illustrating the recording of a reflection-type slanted-fringe hologram using a recording system of the present invention.
Figure 10:
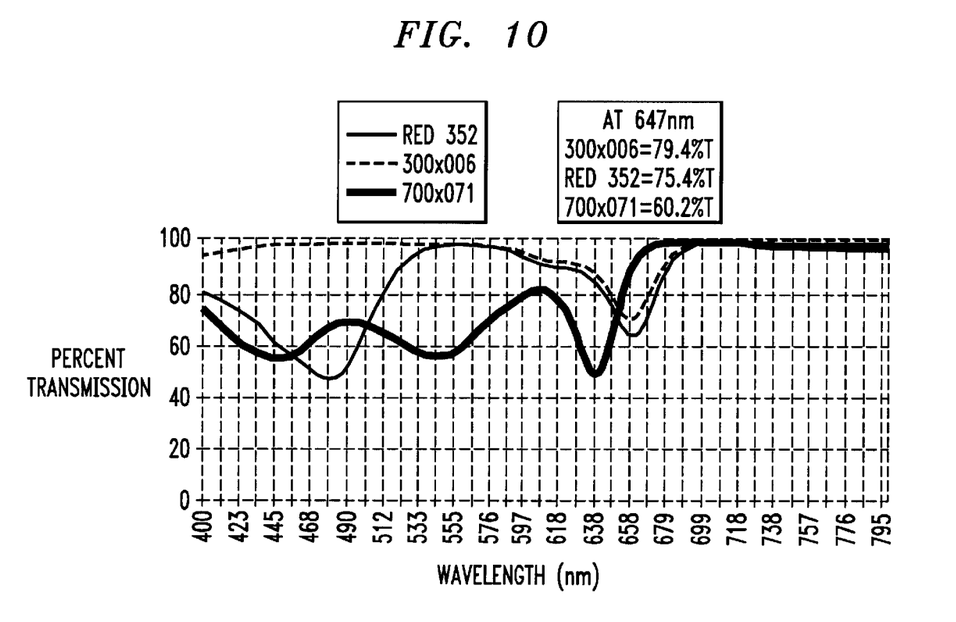
FIG. 10 is a schematic representation of the transmission curves for three types of photopolymers used during the practice of the holographic recording process of the present invention.

Consistent with the above geometrical optics model, a novel recording arrangement is disclosed in FIG. 9 for use with the recording systems as described herein, e.g. FIG. 1A. The recorded hologram can then be delaminated from the recording prisms and laminated onto a playback substrate as in FIGS. 2A and 2B. Notably, Equation (34) describes the relations that must hold between these holographic recording and playback arrangements in accordance with the above-developed geometrical optics model. Provided that the conditions defined by Equation (34) are satisfied, the recording arrangement of FIG. 9 can be used to record a slanted fringe volume hologram for use with grazing incidence replay light, using the set of construction parameters (θ$_r$, θ$_s$, α) and the playback system of FIG. 2A or 2B can then be used to replay back the grazing incidence volume hologram using the set of replay parameters (θ$_2$, θ$_{s2}$).

In the recording arrangement shown in FIG. 9, a pair of prisms 22 and 21 are used to record slanted fringes within the recording medium layer 23 using the construction parameters (θ$_2$, θ$_{s2}$). The angle between the surfaces of the prisms used in the system of FIG. 9, is preferably between 30 and 60 degrees and may be, as shown, 45 degrees. In this recording arrangement, the angles θ$_r$ and θ$_s$ can be changed independently to provide the desired fringe angle and spacing of the hologram under construction. In this recording system, the beam ratio $$\left(\text{i.e.} \frac{A_r}{A_s}\right)$$

is optimized as described hereinabove in order to maximize the light diffraction efficiency of the hologram at its Bragg angle.

In practice, the prism-based recording system of FIG. 9 is realized as or is a part of the holographic recording system of FIG. 1A. The recording system need not satisfy the strict index matching requirements of the recording arrangement described in Case 1 and Case 2. Preferably, the incident reference and object beams entering the prisms have very large radius of curvature. The prisms are held in particular relation to the recording medium so that the construction parameters are realized during recording. Suitable support structures (not shown) are used to support the prisms relative to the optical bench of the recording system. Reference and object beam-forming optics are realized on the optical bench using conventional apparatus and techniques.

In mass-production applications, the recording system of FIGS. 9 (and e.g. 1A) can be realized as a high-speed holographic recording machine comprising computer-controlled equipment for moving the prisms relative to the recording medium which can be supported on a recording substrate carried by a support platform that is rotatable/translatable relative to the optical bench. Exposure control in the Case 1 scenario can be realized using a light detector and a controller to commence and cease exposure. Preferably, such a system also includes means for realizing the beam ratio optimization technique described above.

In the exemplary playback arrangement shown in FIGS. 2A or 2B, but where the hologram was recorded using the prism arrangement of FIG. 9, a reference beam of wavelength a1 is used to illuminate (at grazing incidence angles) the edge of the substrate upon which the hologram is supported during replay, permitting reconstruction of the object beam wavefront. The angle of the object beam is determined by Equation (34). When using this geometrical playback arrangement, the index of refraction of the substrate is preferably matched to the hologram (i.e. exposed/developed I recording medium) using the same refractive index matching techniques described hereinabove, and noting the reduced stringency requirements detailed above.

The above-described recording/playback arrangement has several important advantages over prior art systems. In particular, it permits the use of a larger wavelength laser (e.g. a krypton laser of wavelength 647 nm, or an infrared laser) and shallow reference angles during recording, while permitting the use of a lower wavelength light source, and desired steep reference angles during replay. Additional advantages exist in the ability to use a lower frequency, less costly laser to produce holograms responding to lower replay wavelenths. This can be a significant advantage for multicolor hologram systems. Also during recording, prisms 20 and 21 of FIG. 9 make it easier to deliver reference and object beams to the recording medium in a manner which effectively ensures that the spatial intensity of both the reference and object beams can easily be made substantially uniform over the entire region of concern within the recording medium. This feature ensures high uniformity in fringe contrast when recording fixed spatial-frequency light diffractive gratings. Also, while the recording system of FIG. 9 provides an improved way to record reflection-type, grazing-incidence volume holograms, such holograms can be replayed in either the transmission or reflection mode.

When recording grazing incidence holograms under Case 1 conditions, the set of characteristic plots given in FIG. 5 can be used to create a recording system which achieves optimal light-coupling into the recording media at steep reference angles. When recording grazing incidence holograms under Case 2 conditions, a gradient index matching technique is used to form a gradient-type index at the substrate-recording media interface. The "fluorescence intensity versus time" characteristic shown in FIG. 8 can be used to determine (i) when the maximum level of exposure has been achieved for optimal modulation depth in the recording media recordings, and (ii) when the optimal gradient index matching has been realized at the interface of the recording media and the supporting substrate.

In order to maximize the fringe contrast of the grazing incidence holograms using the system and process of the present invention, sensitization information and absorption coefficients can be obtained from the transmission curves associated with the recording media, which for the above-referenced DuPont photopolymer films, are shown in FIG. 11 for illustrative purposes. For example, with a 60% transmission factor at 647 nm, an absorption coefficient for the HRF 700×071 photopolymer was deduced as $a=0.0127\mu m^{-1}$. In the illustrative embodiments of the present invention, the internally measured angle of incidence used to record the holograms was selected to be $\theta=78°$ (i.e. measured in the recording medium). Using Equation (12) derived above, the theoretical optimal beam ratio was determined to be 2.6:1, and that under those conditions, the average fringe contrast in the resulting edge-referenced hologram was computed to be 0.92.

Figure 12:
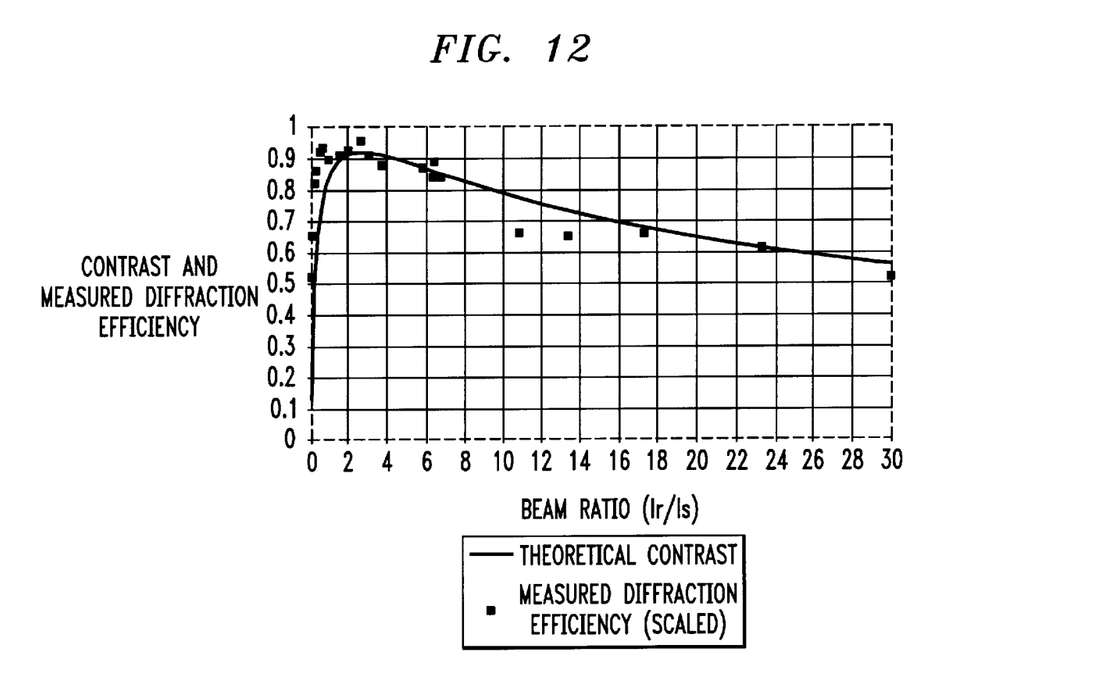
FIG. 12 is a schematic representation illustrating the theoretical and actual light diffraction efficiencies of grazing incidence holograms (measured on Bragg) recorded using different beam ratios during the holographic recording process of the present invention.

As expected, the measured light diffraction efficiency (on Bragg) versus beam ratio for grazing incidence holograms made using the various DuPont photopolymers described above, closely matched that predicted by the theoretical model developed hereinabove. Both the actual and theoretical light diffraction efficiency characteristics are plotted in FIG. 12, showing a very strong correlation between theory and practice of the present invention.

Figure 13:
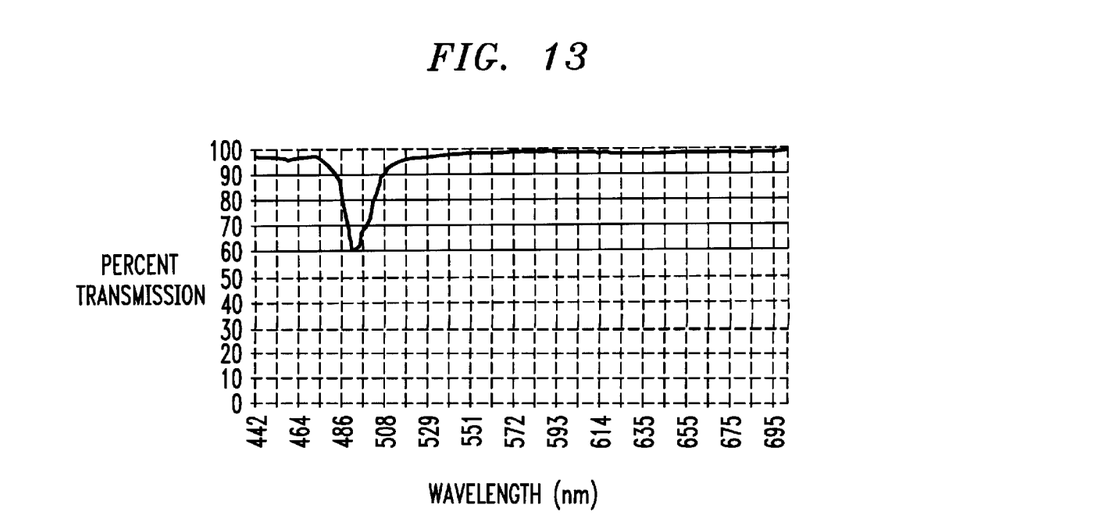
FIG. 13 is a schematic representation illustrating the transmission spectrum of a grazing incidence hologram recorded using the geometrical arrangement illustrated in FIG. 9.

The transmission spectrum of a slanted-fringe volume hologram recorded with the arrangement of FIG. 9 is graphically illustrated in FIG. 13. This transmission characteristic was obtained by viewing the hologram during playback at normal incidence (i.e. replaying at $\theta_s=0°$). As shown in FIG. 13, the hologram exhibited a transmission minimum at 490 nm, corresponding to a reflection of light from the hologram at $\theta R2$ 98.3° out of the edge of the substrate and away from the detector used during measurement.

While the particular illustrative embodiments of holographic system and method described above will be useful in many applications, further modifications to the present invention will occur to persons with ordinary skill in the art. All such modifications are deemed to be within the scope and spirit of the present invention defined by the appended claims.

What is claimed is:

1. A system for illuminating a volume hologram having slanted fringes, the system comprising:

a substrate made from an optically transparent material having an index of refraction $n_s$, the substrate having a front and a rear surface disposed substantially parallel to one another, and an edge surface disposed between the front and rear surfaces;

a volume slanted fringe hologram made from an optically transparent material having a bulk index of refraction $n_m$ greater than $n_s$ with the difference in index of refraction therebetween being equal to $\Delta n$, and a rear surface of the hologram being proximate to the front surface of said substrate along an interface;

a light source for producing an illumination beam which propagates along a single-pass optical path extending through said substrate at a grazing angle of incidence $\phi_s$, of at least about 80 degrees with respect to the normal to the interface, so that the illumination beam couples into the hologram and interacts with the slanted fringes to produce an output beam;

and wherein the slanted fringe hologram is illuminated in the reflection hologram mode.

* * * * *